US008473605B2

(12) United States Patent
Orr et al.

(10) Patent No.: US 8,473,605 B2
(45) Date of Patent: Jun. 25, 2013

(54) METHODS AND APPARATUS FOR FAST CHANNEL SWITCHING BETWEEN REAL TIME CONTENT ON A DEVICE

(75) Inventors: Brian William Orr, San Diego, CA (US); Douglas Marion Crockett, San Diego, CA (US); Mark Maggenti, Del Mar, CA (US); Robert Stacey, San Diego, CA (US); Sapna Mehta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 12/260,852

(22) Filed: Oct. 29, 2008

(65) Prior Publication Data

US 2009/0132725 A1    May 21, 2009

Related U.S. Application Data

(60) Provisional application No. 60/983,840, filed on Oct. 30, 2007.

(51) Int. Cl.
    *G06F 15/173*    (2006.01)

(52) U.S. Cl.
    USPC ........................................................ 709/224

(58) Field of Classification Search
    USPC . 709/238, 250, 224; 370/395.1, 389; 348/441
    See application file for complete search history.

(56) References Cited

U.S. PATENT DOCUMENTS

| 6,791,620 | B1 * | 9/2004 | Elswick et al. ............... 348/441 |
| 2004/0228345 | A1 * | 11/2004 | Cho et al. ................... 370/395.1 |
| 2007/0287451 | A1 * | 12/2007 | Seo et al. ...................... 455/434 |
| 2008/0092203 | A1 * | 4/2008 | Bouazizi et al. .............. 725/135 |
| 2008/0151885 | A1 * | 6/2008 | Horn et al. .................... 370/389 |
| 2008/0228912 | A1 * | 9/2008 | Vedantham et al. .......... 709/224 |

FOREIGN PATENT DOCUMENTS

| CN | 2794050 Y | 7/2006 |
| JP | 2003523103 T | 7/2003 |
| JP | 2004104415 A | 4/2004 |
| JP | 2005328269 A | 11/2005 |
| WO | 2006/084503 | 8/2006 |

OTHER PUBLICATIONS

International Preliminary Report on Patentability, PCT/US2008/081788, International Preliminary Examining Authority, European Patent Office, Feb. 3, 2010.

(Continued)

*Primary Examiner* — Kyung H Shin
(74) *Attorney, Agent, or Firm* — Fulbright & Jaworski L.L.P.

(57) ABSTRACT

Methods and apparatus for fast channel switching between real time content on a device. In an aspect, a method includes receiving a channel selection indicator that identifies a channel comprising real time content to be rendered, determining whether the real time content can be rendered using an existing rendering pathway, and inputting the real time content into the existing rendering pathway if it is determined that the real time content can be rendered using the existing rendering pathway. An apparatus includes a user interface to receive a channel selection indicator that identifies a channel comprising real time content to be rendered, processing logic to determine whether the real time content can be rendered using an existing rendering pathway, and a rendering interface to input the real time content into the existing rendering pathway if it is determined that the real time content can be rendered using the existing pathway.

20 Claims, 5 Drawing Sheets

OTHER PUBLICATIONS

Einarsson M Westerlund T Lohmar I Johansson Ericssont: "Multiple aggregated control URIs for RTSP; draft-einarsson-mmusic-rtsp-macuri-01.txt" IETF Standard-Working-Draft, Internet Engineering Task Force, IETF, Ch, No. 1, Dec. 21, 2006, pp. 1-16, XP015047576, ISSN: 0000-0004.

Ericsson: "Fast Channel Switching in PSS" 3GPP Draft; S4-AHP309-FCS, 3RD Generation Partnership Project (3GPP), Mobile Competence Centre; 650, Route Des Lucioles; F-06921 Sophia-Antipolis Cedex; France vol. tsg_sa/WG4-CODEC/Ad-hoc_PSM/Docs, no. Sophia Antipolis, France; 20041011, Jan. 9, 2007, pp. 1-4, XP050282686.

Ericsson: "Use-Case and Requirements for Fast Channel Switching" 3GPP TSG-SA4 PSM ADHOC; TDOC S4-AHP301, Oct. 20, 2006, pp. 1-4.

International Search Report, PCT/US2008/081788/ International Searching Authority, European Patent Office, Apr. 24, 2009.

Written Opinion, PCT/US2008/081788/ International Searching Authority, European Patent Office, Apr. 24, 2009.

* cited by examiner

METHODS AND APPARATUS FOR FAST CHANNEL SWITCHING BETWEEN REAL TIME CONTENT ON A DEVICE

CLAIM OF PRIORITY UNDER 35 U.S.C. §119

The present Application for patent claims priority to Provisional Application No. 60/983,840 entitled "METHODS AND APPARATUS FOR FACILITATING FAST CHANNEL SWITCHING FOR REAL-TIME FLOWS" filed Oct. 30, 2007, and assigned to the assignee hereof and hereby expressly incorporated by reference herein.

BACKGROUND

Real time multimedia content is typically delivered over a communication network to devices for rendering. For example, the real time content may be organized into content channels that are delivered over the network. Each content channel comprises a "flow" which may include video, audio, closed captioning, overlay information and any other suitable information for rendering on a device. Rendering logic, such as multimedia players and associated hardware and software at the device operate to process the received channels, perform any necessary decoding, descrambling, filtering, transformations, and any other processes necessary to render the content at the device. For example, the rendering logic typically constructs a rendering pathway that comprises all the processing functions necessary to process a received flow to extract and render the content on the device.

Typically, devices are able to switch between received content channels at the request of the device user. For example, a device user may switch between news and entertainment channels by navigating a programming guide and selecting the desired programming. When channel changes are requested, it is desirable that the change occurs very quickly. Otherwise, the device user may experience a long delay, blank screen, distorted images or other undesirable effects.

Unfortunately, conventional media players or other rendering logic at the device may "reinitialize" when it is detected that the source of the content has changed. For example, when the user requests a channel change, a media player on the user's device may be re-initialized to render the content on the new channel. However, re-initialization may take more than a few seconds. For example, a content channel switch may result with the media player tearing down its existing rendering pathway and constructing a new rendering pathway to render the content associated with the new channel. This process may take a few seconds and as a consequence, a device user will experience a delay in viewing the selected channel, which may result in an unsatisfactory user experience.

Therefore, what is needed is a mechanism for use on a device to provide fast channel switching between available content channels to reduce or eliminate delays and provide an enhanced user experience.

SUMMARY

A method for channel switching. Receiving a channel selection indicator that identifies a second channel comprising second content to be rendered instead of a first channel having first content currently being rendered via an first rendering pathway. Next a determination is made as to whether the second content can be rendered using the first rendering pathway. If it is determined that the second content can be rendered using the first rendering pathway, inputting the second content into the first rendering pathway.

An apparatus for channel switching at a device to render real time content. The apparatus includes a user interface configured to receive a channel selection indicator that identifies a channel comprising real time content to be rendered. The apparatus also includes processing logic configured to determine whether the real time content can be rendered using an existing rendering pathway. The apparatus further includes a rendering interface configured to input the real time content into the existing rendering pathway if it is determined that the real time content can be rendered using the existing rendering pathway.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a channel switching system that operates to provide fast and efficient channel switching at a device. The system is especially well suited for use with devices in wireless networks environments, and may be used by devices in any type of network environment, including but not limited to, communication networks, public networks, such as the Internet, private networks, such as virtual private networks (VPN), local area networks, wide area networks, long haul network, or any other type of data network.

In various aspects, the channel switching system operates to avoid the time needed for rendering logic to tear down and construct new rendering pathways by determining whether or not content to be rendered is compatible with a currently existing rendering pathway. If the content is compatible, the system directs the content into the currently existing rendering pathway for rendering at a device. As a result, the time typically spent tearing down an old rendering pathway and constructing a new rendering pathway is saved, which provides a very fast and efficient channel switch thereby enhancing the user's experience.

Figure 1:
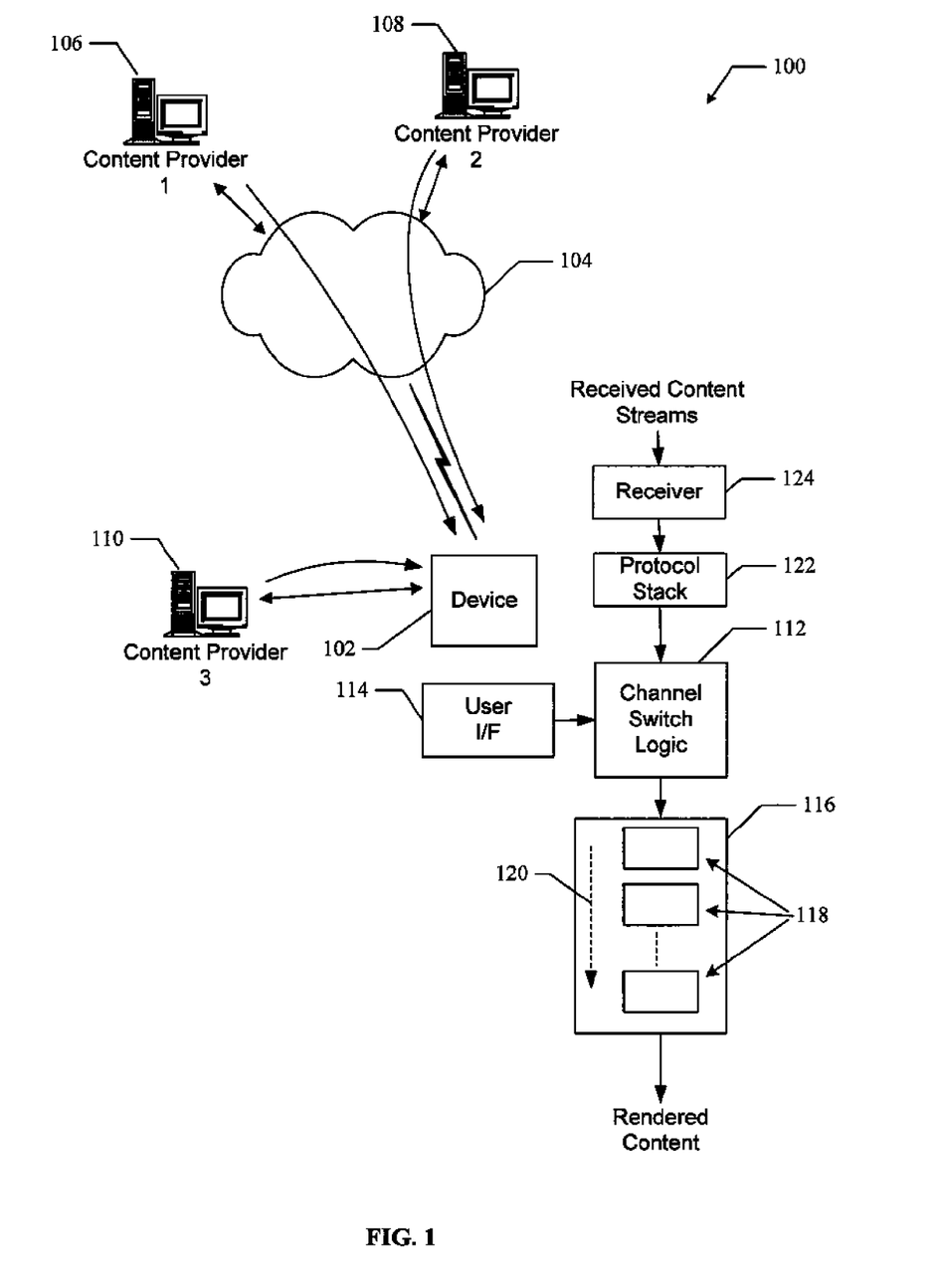
FIG. 1 shows a network that illustrates aspects of a channel switching system.

FIG. 1 shows a network 100 that illustrates aspects of a channel switching system. The network 100 comprises a device 102 that is coupled to a data network 104. The data network 104 may be any type and/or combination of wired and/or wireless networks that allow data to be transmitted between devices in communication with the network 100. For example, the data network 104 may comprise a mobile broadcasting network such as a MediaFLO network from the assignee of the present application, or a DVD-H network. Two content providers (106, 108) are coupled to the network 100. The content providers 106 and 108 communicate with the network 104 via any suitable communication channel. For example, the communication channel may be any type of wired or wireless communication channel that allows the content providers 106 and 108 to communicate with the data network 104. The device 102 communicates with the data network 104 with the via a wireless communication link that allows data to be wirelessly transmitted between the network 104 and the device 102. In an aspect, the wireless communication links comprise forward communication channels, reverse communication channels, control channels, and/or any other type of communication channel that may be used to communicate information between the network 104 and the device 102. It is also to be recognized that a variety of intermediary network devices are not illustrated in FIG. 1 to avoid obfuscating the subject mater of the described aspects.

A third content provider 110 is in communication with the device 102 without going through the network 104. For example, the content provider 110 may communicate with the device 102 using any type of communication channel or may be directly coupled to the device 102. For example, the communication channel may comprise a 3G wireless network. The content providers 106, 108 and 110 operate to provide content to the device 102. For example, the content may be provided in a real time transport protocol (RTP) or provided as files in (MP4) format. For example, the content comprises content channels carrying flows that include applications, programs, multimedia content, advertising and/or any other type of content and/or data that may be rendered on the device 102.

The device 102 comprises a receiver 124, channel switch logic 112, a user interface 114, protocol stack 122, and rendering logic 116. In an aspect, the channel switch logic 112 operates to receive or have access to the content channels provided by the content providers 106, 108, and 110. For example, the receiver 124 receives content channels and provides real time content to the protocol stack 122, which in turn passes the content to the channel switch logic 112 based on flow identifiers; one flow per channel and each flow comprising video, audio, captioning, and overlays etc.

The channel switch logic 112 operates to select a particular content channel and inputs data from this content data to the rendering logic 116. In an aspect, the user interface 114 operates to receive user input which specifies the particular content channel to be rendered at the device 102. The user interface 114 signals the channel selection to the channel switch logic 112. The channel switch logic 112 then operates to control the rendering logic 116 to construct the functional elements 118 needed to decode and render the content. For example, the functional elements comprise content filters, transform filters, decoders, and/or any other type of functional element needed to process the content flow of the selected channel for rendering at the device 102. In an aspect the functional elements 118 that are assembled to render the content stream form a rendering pathway, as illustrated at 120 that can be used to render the content of the selected channel.

During operation, the device user may request a channel change to render content from a different channel. The user interface 114 passes the channel selection request to the channel switch logic 112. In an aspect, the channel switch logic 112 operates to control the rendering logic 116 to reinitialize itself in response to the channel change request. Thus, the existing rendering pathway is torn down or disassembled. The channel switch logic 112 then controls the rendering logic 116 to construct a new rendering pathway to process and render content from the new channel.

In another aspect, the channel switch logic 112 receives the channel change request from the user interface 114 and determines the type of content on the new channel to be rendered. The channel switch logic 112 then determines if a current rendering pathway can be used to render the content on the new channel. For example, channel switch logic 112 determines whether or not the functional elements 118 that currently exist on the rendering pathway 120 are able to process and render the content on the new channel.

If the channel switch logic 112 determines that the current rendering pathway 120 can process and render the content on the new channel, then the channel switch logic 112 does not re-initialize the rendering logic 116 but instead, feeds the content from the new channel into the current rendering pathway. As a result, the content from the new channel is rendered very quickly without the delays necessary to reconstruct a new rendering pathway. Thus, in various aspects, the channel switching system operates to provide for fast channel switching on a device for an enhanced user experience.

Figure 2:
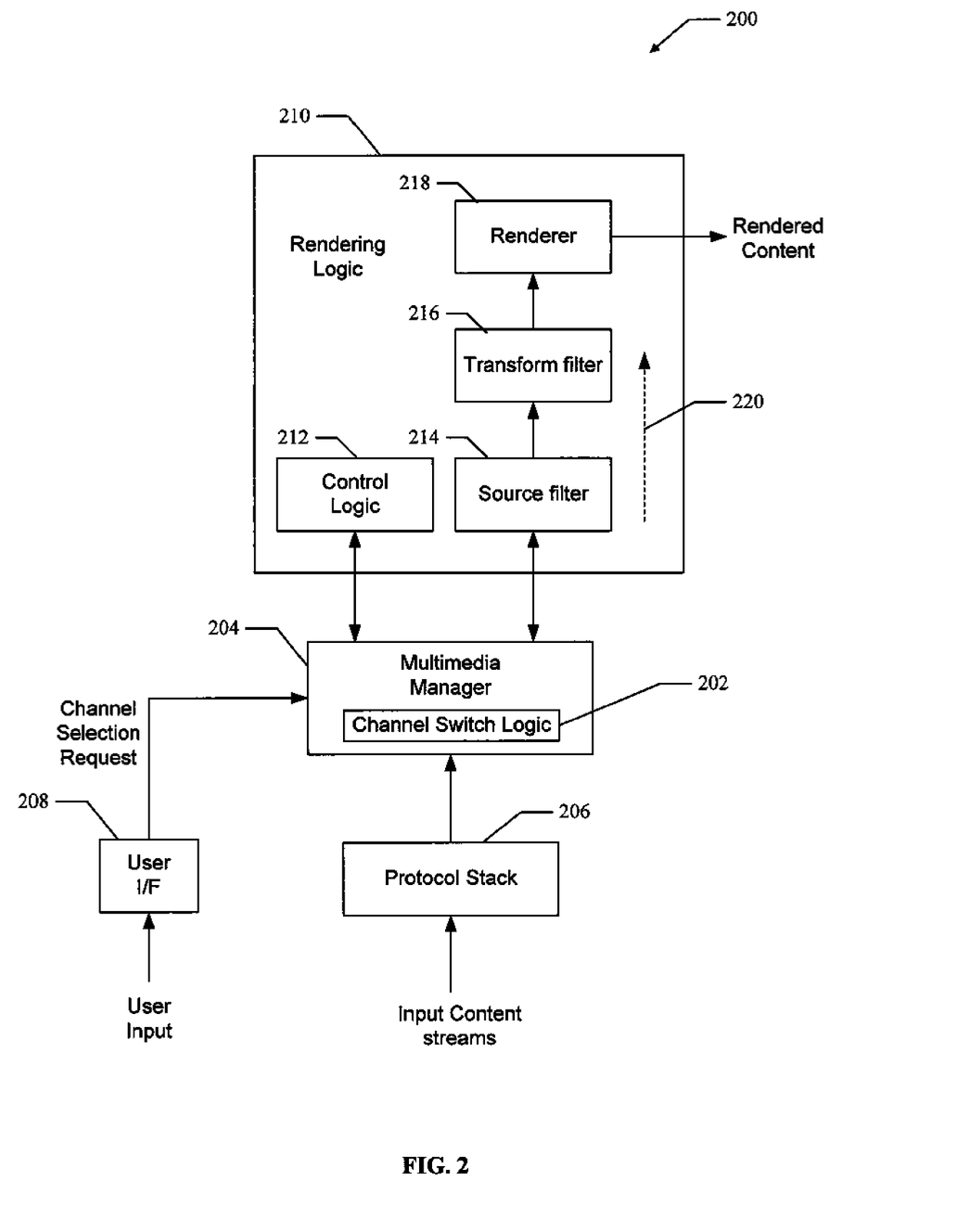
FIG. 2 shows a detailed diagram illustrating exemplary aspects of a channel switching system.

FIG. 2 shows exemplary aspects of a channel switching system 200 for use at a device. In an aspect, channel switch logic 202 is provided as part of a multimedia manager 204. In other aspects, the channel switch logic 202 may be a stand-alone module or provided as part of any other module at the device. A protocol stack 206 receives content streams from one or more sources. For example, the protocol stack 206 may receive the content streams from a network and/or from another communication channel. The content streams comprise one or more content channels that can be selected for rendering on a device.

A user interface 208 operates to receive user input and signals the multimedia manager 204 with channel selection requests from a user. The multimedia manager 204 provides control signals to control logic 212 of rendering logic 210. The rendering logic 210 comprises decoders and a renderer 218. The control logic 212 operates to construct a rendering pathway 220 that includes functional elements that operate to process content data associated with a selected content channel. For example, the rendering pathway 220 comprises a source filter 214 and a transform filter 216. The source filter 214 and the transform filter 216 process content data received from the multimedia manager 204. For example, the source filter 214 understands the format of the received transport stream and extracts media data for presentation to the transform filter 216. The transform filter 216 is a pluggable filter, such as an H264 decoder that takes in data from the source filter 214 and decompresses it. The processed data is then input to a renderer 218 that operates to render the content on the device. For example, the renderer 218 operates to render video, audio, and overlays that are included in the content data.

For the purpose of this description, it will be assumed that a first content channel is being rendered. For example, the protocol stack 206 provides content data of the first channel to the multimedia manager 204. The multimedia manager 204 communicates with the protocol stack 206 to receive real time content and also functions to multiplex in streams from other transports if needed. The multimedia manager 204 communicates with the control logic 212 to set up a rendering pathway 220 to decode the data for rendering. The renderer 218 operates to render the data on the device. In an aspect the user provides input to the user interface 208 to indicate a channel switch to a particular content channel. The user interface 208 sends a channel selection indicator to the multimedia manager 204 indicating the new channel selection. The channel switch logic 202 also receives this selection indicator. In various aspects, the channel switch logic 202 operates to perform one or more of the following functions.

1. Determines if the content on the new channel has the same format as the content currently being rendered. For example, there is no guaranteed that the source 214 and transform 216 filters to decode the new channel will be the same as those being used for the current channel.
2. If the content on the new channel is formatted differently from the content currently being rendered, the channel switch logic 202 notifies the control logic 212 to construct a new rendering pathway 220 to decode the content on the new channel.
3. If the content on the new channel is formatted the same as the content currently being rendered, (i.e., same source 214 and transform 216 filters may be used) the channel switch logic 202 operates to input data from the new content channel into the current rendering pathway without re-initializing the rendering logic 210.

Therefore, a fast channel switch is achieved because the current rendering pathway is used for the new content thereby avoiding the time necessary to tear down and reconstruct a new rendering pathway.

Figure 3:
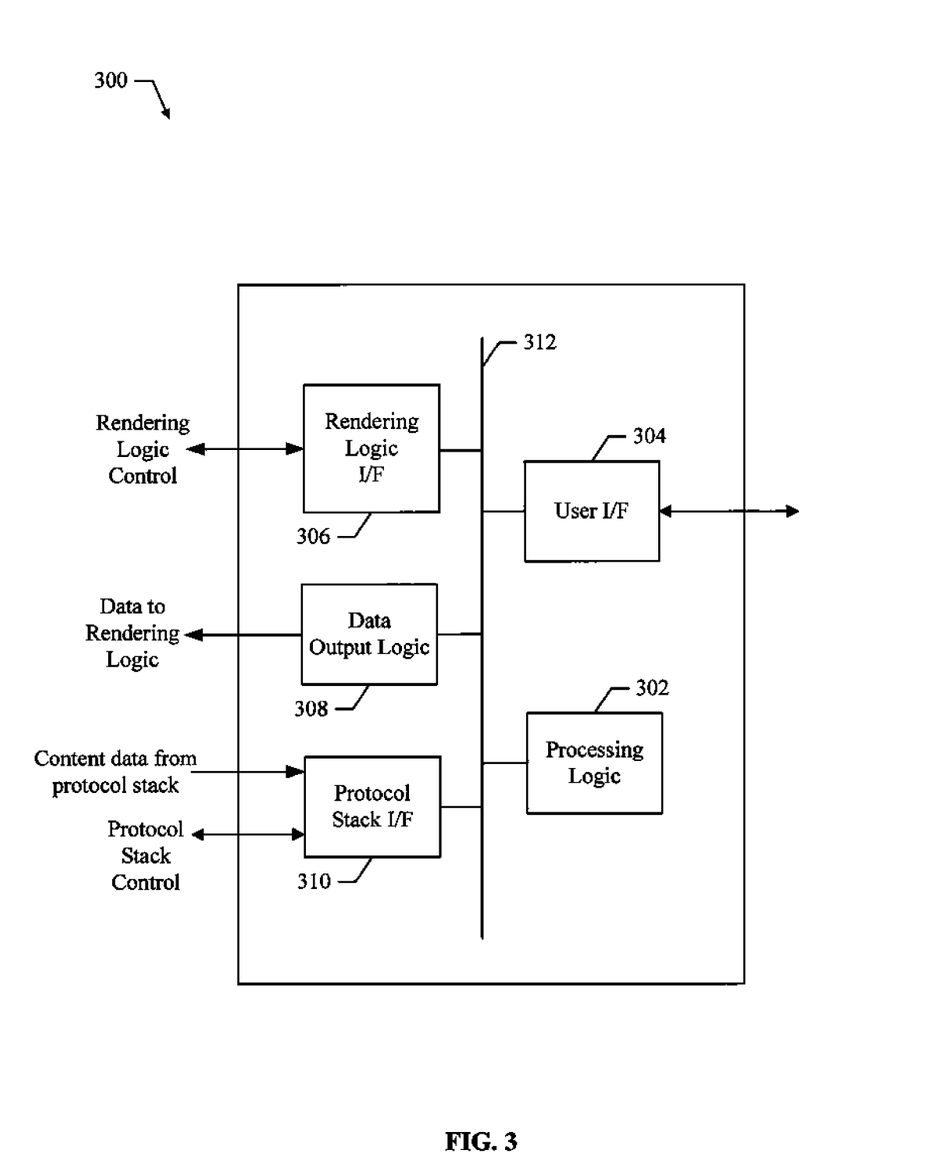
FIG. 3 shows exemplary channel switching logic for use in aspects of a channel switching system.

FIG. 3 shows exemplary channel switch logic 300 for use in aspects of a channel switching system. For example, the channel switch logic 300 is suitable for use as the channel switch logic 202 shown in FIG. 2. The channel switch logic 300 comprises processing logic 302, user interface 304, rendering logic interface 306, data output logic 308, and protocol stack interface 310, all coupled to a data bus 312.

In various aspects, the processing logic 302 comprises at least one of a CPU, processor, gate array, hardware logic, memory elements, virtual machine, and/or hardware executing software. Thus, the processing logic 302 generally comprises logic to execute machine-readable instructions to control one or more functional elements of the channel switch logic 300 via the data bus 312.

The user interface 304 comprises hardware and/or hardware executing software that allow the channel switch logic 300 to communicate with a user to receive user input. For example, the user input comprises channel selection requests that request the rendering of content from a selected channel. The user interface 304 passes channel section information to the processing logic 302.

The protocol stack interface 310 comprises hardware and/or hardware executing software that operate to allow the channel switch logic 300 to receive content data and/or other information associated with one or more received content channels. For example, in an aspect, a protocol stack associated with a device may receive channel content from a variety of sources and operates to make this channel content available to the protocol stack interface 310. The protocol stack interface 310 is configured to provide protocol stack control signals to request selected content data from a protocol stack. The protocol stack interface 310 is also configured to receive content data associated with a selected content channel from the protocol stack.

The rendering logic interface 306 comprises hardware and/or hardware executing software that operate to allow the channel switch logic 300 to pass control information to rendering logic at a device. For example, the control information that is passed operates to control the rendering logic to re-initialize and to construct a rendering pathway to render a selected channel content.

The data output logic 308 comprises hardware and/or hardware executing software that operate to allow content data from a selected content channel to be passed to rendering logic to be processed by a rendering pathway so that it can be rendered on the device.

During operation of the channel switch logic 300, a user enters channel selections into the user interface 304, which passes the information to the processing logic 302. The processing logic 302 determines if a content channel is currently being rendered. If no content channel is being rendered, the processing logic 302 controls the protocol stack interface 310 to obtain the content for the selected channel. The processing logic 302 also controls the rendering logic interface 306 to signal the rendering logic to construct a new rendering pathway to render the selected content channel. The processing logic 302 then controls the data output logic 308 to output the data of the selected content channel to the rendering logic for processing and rendering by the newly constructed rendering path.

In an aspect, the processing logic 302 operates to determine that the selected content channel can be rendered by an existing rendering pathway. For example, if an existing rendering pathway has been previously constructed to render content, the processing logic 302 determines if that existing pathway can be used to render the selected content. If the existing pathway can be used, the processing logic 302 operates to control the data output logic 308 to output the data of the selected content channel to the rendering logic where it is processed by the existing rendering pathway. Thus, a fast channel switch is achieved, since a new rendering pathway does not need to be constructed to render the content of the selected content channel.

In various aspects, the channel switching system comprises a computer program product having one or more program instructions ("instructions") or sets of "codes" stored or embodied on a machine-readable medium. When the codes are executed by at least one processor, for instance, a processor at the processing logic 302, their execution causes the processor to provide the functions of the channel switching system described herein. For example, the machine-readable medium comprises a floppy disk, CDROM, memory card, FLASH memory device, RAM, ROM, or any other type of memory device or machine-readable medium that interfaces to channel switch logic 300. In another aspect, the sets of codes may be downloaded into the channel switch logic 300 from an external device or communication network resource. The sets of codes, when executed, cause the channel switch logic 300 to provide aspects of a channel switching system as described herein.

Figure 4:
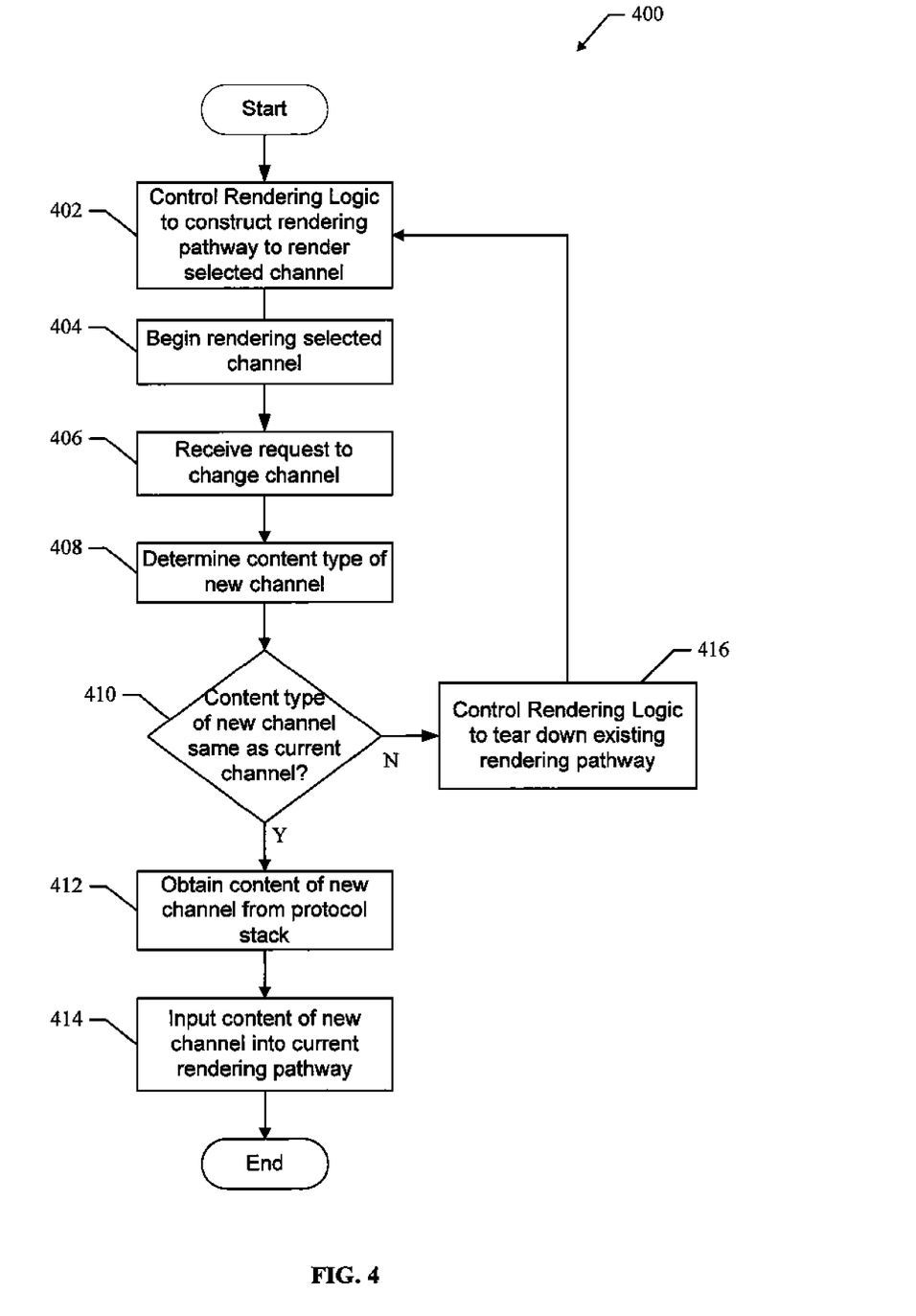
FIG. 4 shows an exemplary method for providing aspects of a channel switching system.

FIG. 4 shows an exemplary method 400 for providing aspects of a channel switching system. For clarity, the method 400 will be described with reference to the channel switch logic 300 shown in FIG. 3. In one or more aspects, the processing logic 302 executes program instructions to perform the functions described below.

At block 402, rendering logic at a device is controlled to construct a rendering pathway to render selected content. For example, the processing logic 302 controls the rendering logic interface 306 to signal the rendering logic to construct a rendering pathway to render content having a selected format.

At block 404, the rendering logic begins rendering the selected content on a device. In an aspect, the processing logic 302 operates to control the protocol stack interface 310 to obtain the selected content data from a protocol stack and pass this content data to the data output logic 308. The data output logic 308 then passes the content data to rendering logic to be rendered using the current rendering pathway.

At block 406, a channel request is received to render content on a different channel. In an aspect, a user inputs a channel request to the user interface 304. The channel request is passed to the processing logic 302.

At block 408, the content type of the new channel is determined. In an aspect, the processing logic 302 determines the content type of the content on the requested channel.

At block 410, a determination is made as to whether the content type of the content on the requested channel is the same as the content type of the content currently being rendered. If the content types are different, the method proceeds to block 416 to tear down the existing rendering pathway. If the content types are the same, the method proceeds to block 412. In an aspect, the processing logic 302 makes this determination.

At block 416, rendering logic at a device is controlled to tear down the existing rendering pathway so that a new rendering pathway can be constructed to render different content. For example, the processing logic 302 controls the rendering logic interface 306 to signal the rendering logic to tear down the existing rendering pathway.

At block 412, the content associated with the new channel selection is obtained from a protocol stack. In an aspect, the processing logic 302 controls the protocol stack interface 310 to obtain the content associated with the new channel selection.

At block 414, the content associated with the new channel selection is input into the current rendering pathway. In an aspect, the processing logic 302 operates to control the data output logic 308 to output the content associated with the new content channel to the rendering logic where it is processed by the existing rendering pathway.

It should be noted that the method 400 illustrates just one aspect and that changes, additions, or rearrangements of the operations described above may be made without deviating from the spirit and scope of the various aspects.

Figure 5:
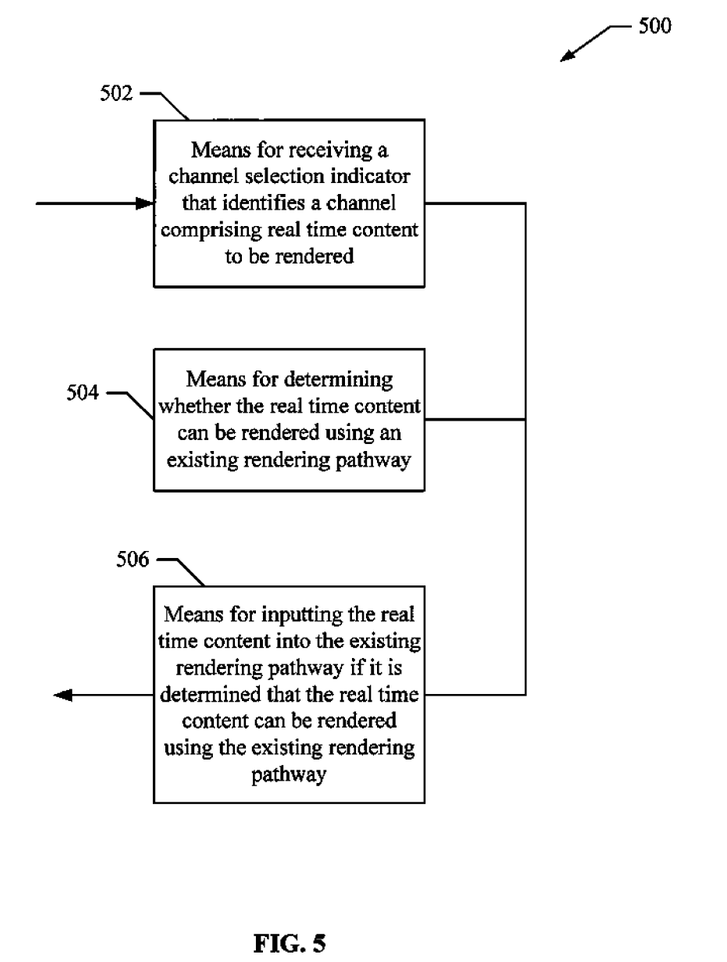
FIG. 5 shows exemplary channel switch logic for use in aspects of a channel switching system.

FIG. 5 shows an exemplary device 500 for providing aspects of a channel switching system. In an aspect, the device 500 is implemented by at least one processor or integrated circuit comprising one or more modules configured to provide aspects of a channel switch system as described herein. For example, each module comprises hardware and/or hardware executing software.

The device 500 comprises a first module that comprises means 502 for receiving a channel selection indicator that identifies a channel comprising real time content to be rendered. For example, in an aspect, the means 502 comprises the user interface 304.

The device 500 comprises a second module that comprises means 504 for determining whether the real time content can be rendered using an existing rendering pathway. For example, in an aspect, the means 504 comprises the processing logic 302.

The device 500 also comprises a third module that comprises means 506 for inputting the real time content into the existing rendering pathway if it is determined that the real time content can be rendered using the existing rendering pathway. For example, in an aspect, the means 506 comprises rendering logic interface 306.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

For example, the apparatus and methods described herein my be implemented in a MediaFLO system. In a Media Flo system, flow content is delivered over UDP/IP across a FDAI interface in a device. Flows can be activated by a service layer or apps opening a UDP socket and joining a multicast IP Address:Port. The multicast IP Address:Port maps to a flow ID per a defined mapping algorithm. Switching to a new flow means leaving multicast for old flow and joining multicast IP address:Port for new flow (i.e. data is now delivered to new IP Address:Port). However, some media players reinitialize when they detect that the source of the content has changed (i.e. data is now coming from a different IP address). Such re-initialization may take more tan 2 seconds. Therefore, to facilitate fast channel switching the following is implemented to avoid re-initialization of the media player: flows are activated by clients opening a TCP/IP socket and sending an activation message over the FDAI messages interface; unicast IP Address:Port (End-Point) that the flow contents need to be sent to is supplied in the message; when switching channels, supplied end-point for new target flow can be the same as the end-point for the old de-activated flow. It is to be remembered that the described methods and apparatus are applicable to systems other than a MediaFLO system, this example being provided for illustrative purposes and not to limit the invention thereto.

Accordingly, while aspects of a channel switching system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for channel switching at a device to render real time content, the method comprising:
receiving a channel selection indicator that identifies a second channel from a wireless network comprising second content to be rendered instead of a first channel from the wireless network having first content currently being rendered via a first rendering pathway in the device;

obtaining the second content from a protocol stack of the device, wherein the protocol stack extracts and repackages the second content from the second channel;

determining whether the second content can be rendered using the first rendering pathway according to a content format of the second content by determining if the second content is of the same content format as the first content; and inputting the second content into the first rendering pathway if it is determined that the second content can be rendered using the first rendering pathway, wherein said inputting the second content into the first rendering pathway comprises sending an activation message indicating that the second content is to be repackaged and delivered to the same endpoint as the first content.

2. The method of claim 1, wherein said receiving comprises receiving the channel selection indicator from a device user.

3. The method of claim 1, wherein the first rendering pathway comprises at least one of a source filter and a transform filter.

4. The method of claim 1, further comprising:
if it is determined that the second content can not be rendered using the first rendering pathway, then performing the operations of:
tearing down the first rendering pathway; and
constructing a second rendering pathway to render the second content.

5. An apparatus for channel switching at a device to render real time content, the apparatus comprising:
a user interface configured to receive a channel selection indicator that identifies a channel from a wireless network comprising real time content to be rendered;
a protocol stack configured to obtain the real time content, wherein the protocol stack extracts and repackages the real time content from the channel;
processing logic including a processor and a memory configured to determine whether the real time content can be rendered using an existing rendering pathway in the device according to a content format of the real time content by determining if the real time content is of the same content format as previously selected real time content associated with a different channel; and
a rendering interface configured to input the real time content into the existing rendering pathway if it is determined that the real time content can be rendered using the existing rendering pathway,
wherein the processing logic is configured to send an activation message indicating that the real time content is to be repackaged and delivered to the same endpoint as the previously selected real time content if it is determined that the real time content can be rendered using the existing rendering pathway.

6. The apparatus of claim 5, wherein said user interface is configured to receive the channel selection indicator from a device user.

7. The apparatus of claim 5, wherein the existing rendering pathway comprises at least one of a source filter and a transform filter used to render the previously selected real time content associated with the different channel.

8. The apparatus of claim 5, wherein the processing logic is configured to tear down the existing rendering pathway and construct a new rendering pathway to render the real time content if it is determined that the real time content can not be rendered using the existing rendering pathway.

9. An apparatus for channel switching at a device to render real time content, the apparatus comprising:
means for receiving a channel selection indicator that identifies a channel from a wireless network comprising real time content to be rendered;
means for obtaining the real time content from a protocol stack, wherein the protocol stack extracts and repackages the real time content from the channel;
means for determining whether the real time content can be rendered using an existing rendering pathway in the device according to a content format of the real time content by determining if the real time content is of the same content format as previously selected real time content associated with a different channel;
means for inputting the real time content into the existing rendering pathway if it is determined that the real time content can be rendered using the existing rendering pathway,
wherein said means for inputting the real time content into the existing rendering pathway comprises sending an activation message indicating that the real time content is to be repackaged and delivered to the same endpoint as the previously selected real time content.

10. The apparatus of claim 9, wherein said means for receiving comprises means for receiving the channel selection indicator from a device user.

11. The apparatus of claim 9, wherein the existing rendering pathway comprises at least one of a source filter and a transform filter used to render the previously selected real time content associated with the different channel.

12. The apparatus of claim 9, wherein if it is determined that the real time content can not be rendered using the existing rendering pathway, then said means for determining comprises:
means for tearing down the existing rendering pathway; and
means for constructing a new rendering pathway to render the real time content.

13. A non-transitory machine-readable medium comprising instructions for channel switching at a device to render real time content, the instructions comprising code for:
receiving a channel selection indicator that identifies a channel from a wireless network comprising real time content to be rendered;
obtaining the real time content from a protocol stack, wherein the protocol stack extracts and repackages the real time content from the channel;
determining whether the real time content can be rendered using an existing rendering pathway in the device according to a content format of the real time content by determining if the real time content is of the same content format as previously selected real time content associated with a different channel; and
inputting the real time content into the existing rendering pathway if it is determined that the real time content can be rendered using the existing rendering pathway,
wherein said inputting the real time content into the existing rendering pathway comprises sending an activation message indicating that the real time content is to be repackaged and delivered to the same endpoint as the previously selected real time content.

14. The non-transitory machine-readable medium of claim 13, wherein said receiving comprises receiving the channel selection indicator from a device user.

15. The non-transitory machine-readable medium of claim 13, wherein the first rendering pathway comprises at least one of a source filter and a transform filter.

16. The non-transitory machine-readable medium of claim 13 comprising further instructions for channel switching at the device to render real time content, the further instructions comprising further code for:
if it is determined that the second content can not be rendered using the first rendering pathway, then performing the operations of:
tearing down the first rendering pathway; and
constructing a second rendering pathway to render the second content.

17. A device operable to channel switch between real time content channels, the device comprising:
a receiver configured to receive content channels;
a user interface configured to receive a channel selection indicator that identifies a channel from a wireless network comprising real time content to be rendered;
a protocol stack configured to obtain the real time content, wherein the protocol stack extracts and repackages the real time content from the channel;
processing logic including a processor and a memory configured to determine whether the real time content can be rendered using an existing rendering pathway in the device according to a content format of the real time content by determining if the real time content is of the same content format as previously selected real time content associated with a different channel; and
a rendering interface configured to input the real time content into the existing rendering pathway if it is determined that the real time content can be rendered using the existing rendering pathway,
wherein the processing logic is configured to send an activation message indicating that the real time content is to be repackaged and delivered to the same endpoint as the previously selected real time content if it is determined that the real time content can be rendered using the existing rendering pathway.

18. The device of claim 17, wherein said user interface is configured to receive the channel selection indicator from a device user.

19. The device of claim 17, wherein the existing rendering pathway comprises at least one of a source filter and a transform filter used to render the previously selected real time content associated with the different channel.

20. The device of claim 17, wherein the processing logic is further configured to tear down the existing rendering pathway and construct a new rendering pathway to render the real time content if it is determined that the real time content can not be rendered using the existing rendering pathway.

* * * * *